Figure 1:
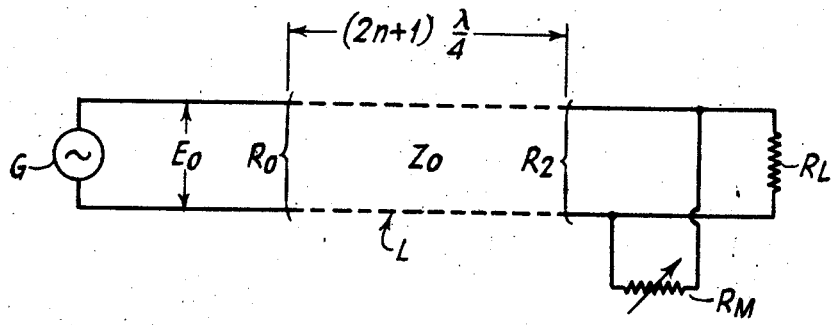

Nov. 3, 1942.

J. L. FINCH 2,301,160

MODULATION SYSTEM

Filed Dec. 31, 1937

4 Sheets-Sheet 1

INVENTOR.
JAMES LESLIE FINCH
BY
ATTORNEY.

Nov. 3, 1942.     J. L. FINCH     2,301,160
MODULATION SYSTEM
Filed Dec. 31, 1937     4 Sheets-Sheet 2

INVENTOR.
JAMES LESLIE FINCH
BY
ATTORNEY.

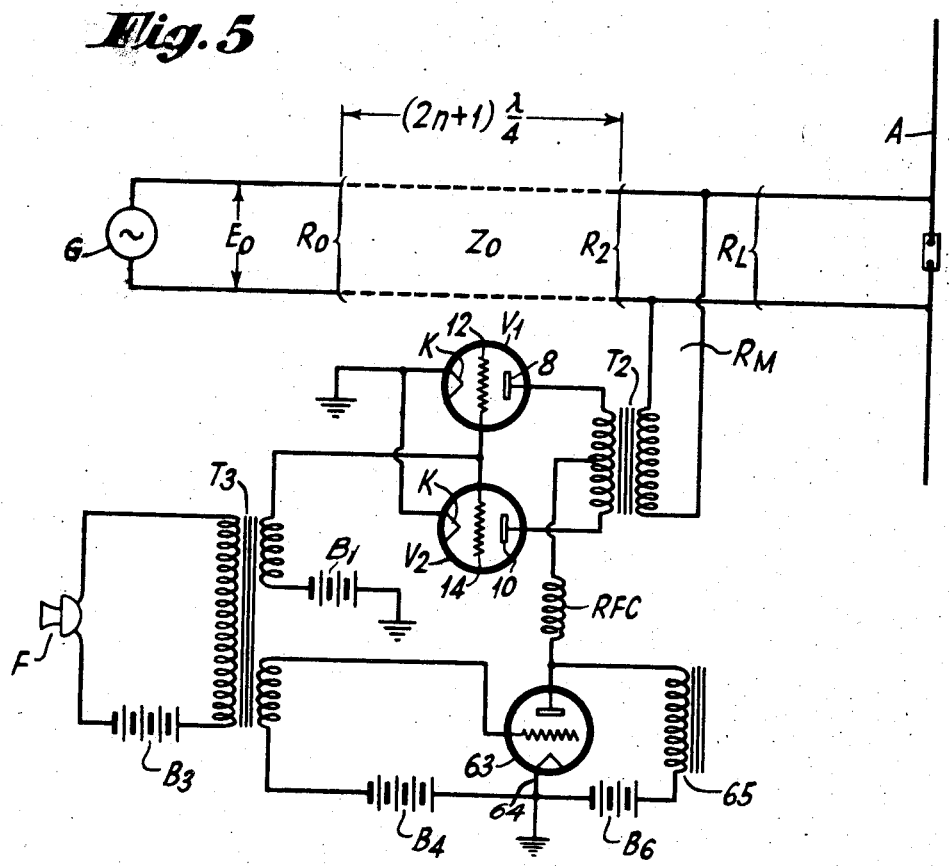
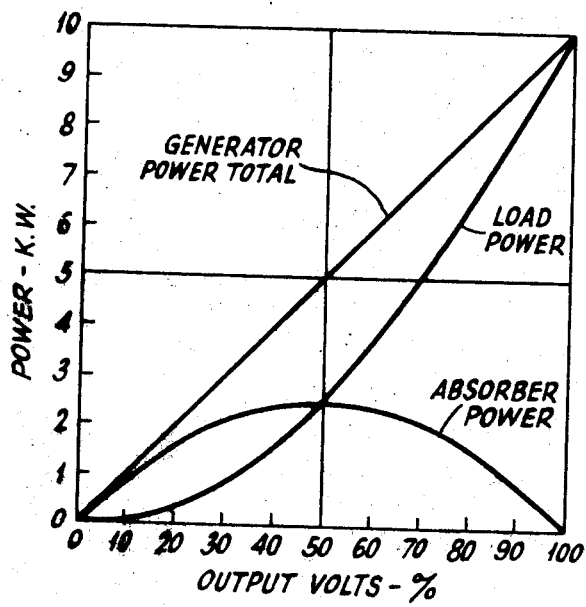

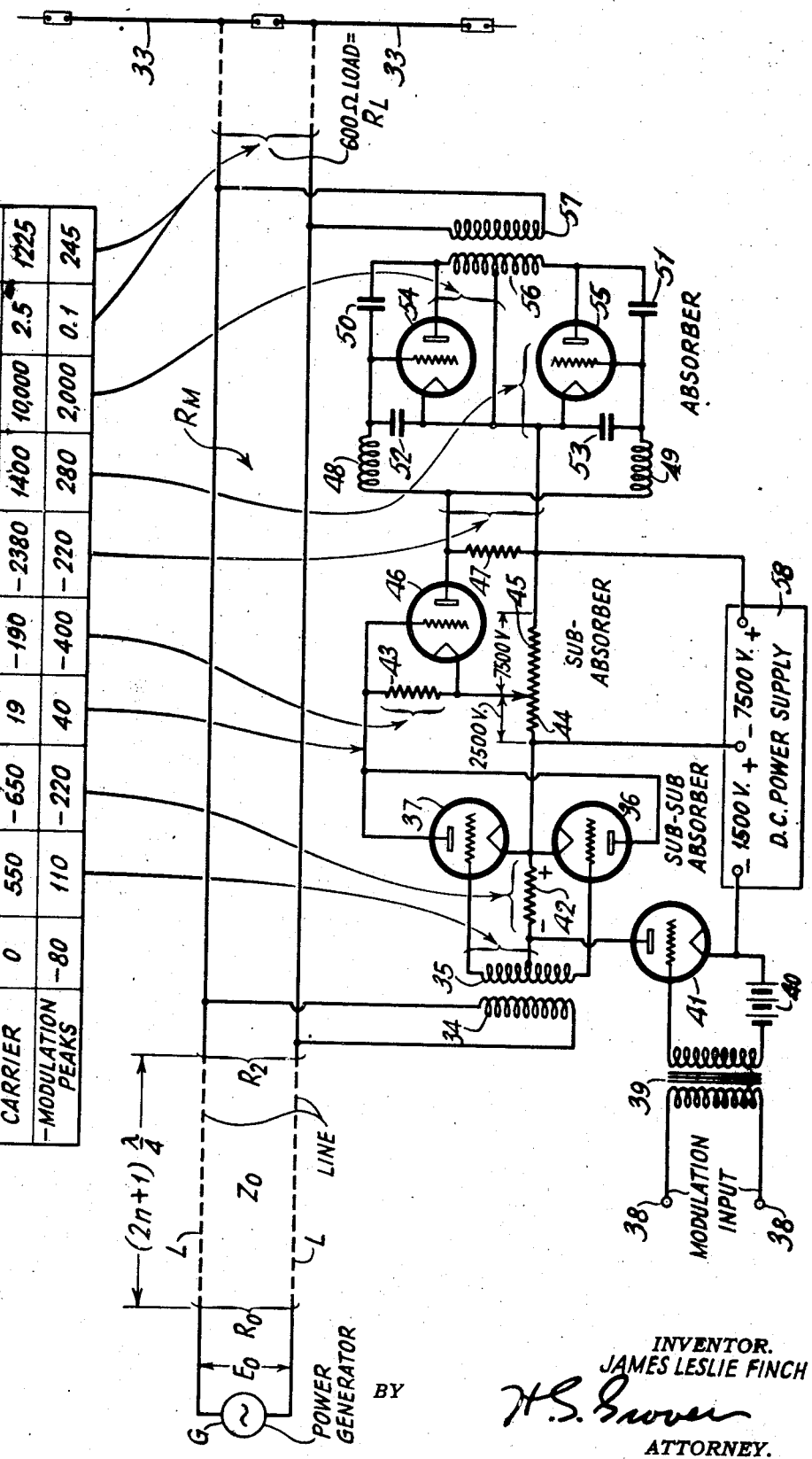

Patented Nov. 3, 1942

2,301,160

UNITED STATES PATENT OFFICE 2,301,160

MODULATION SYSTEM

James L. Finch, Rocky Point, N. Y., assignor to Radio Corporation of America, a corporation of Delaware Application December 31, 1937, Serial No. 182,694

14 Claims. (Cl. 179—171.5)

This application concerns a new and improved means for and method of modulating alternating currents by means of a controlled absorber shunted across the output circuit or load or utilization means with a transmission line interposed between a source of wave energy to be modulated and the said load circuit or output circuit or utilization means. In the prior art where absorber systems have been used for modulating wave energy sources such as generators or amplifiers, the sources tend to supply more power when the absorber system absorbs more power and vice versa. Thus their operation is based on poor regulation and consequently such systems are inefficient. In my invention the generator or source of wave energy puts out less power when the absorber tends to absorb more power. My invention also provides means for modulating very high frequencies, such as used in television circuits, in accordance with voltages representing speech, music, pictures, or any other signals known in the art today.

My invention makes use of the principle that when a power generator is connected to a load through a transmission line of a length equal to an odd number of quarter wave lengths, the impedance of the load at the generator, that is, the input impedance of the line, varies in a direction opposite to that in which the actual load at the output of the line varies. I connect a power absorbing device in shunt to the output terminals of the line, the output of which is to be modulated, and I connect the working load to these output terminals. The source of alternating power within the unit is connected to these output terminals through a transmission line with a length equal to substantially a quarter wave length, or of an odd number of quarter wave lengths. I employ a power generator, which may include amplifiers, of the substantially constant voltage type such that it delivers greater power when working into a lower impedance load. Now when I desire to decrease the output to the working or useful load I cause the power absorbing device to decrease in impedance and thus it tends to increase the power absorbed by it. This results in a decrease in the value of the impedance in which the quarter wave line is terminated. The line being an impedance inverting device this in turn results in an increase in the impedance into which the power generator is delivering power and accordingly causes it to deliver a lesser amount of power. Since a part of this lesser amount of power goes to the power absorbing device, the power to the working or useful load is even further reduced.

In a modification a network such as disclosed in my United States Patent #2,031,639, dated February 25, 1936, may be interposed between the modulating means and the point at which the absorption circuit is connected to the line, the said network input being controlled by peak voltages from the line, thereby controlling the action of the absorber tubes connected with the line.

Various other modifications will also be described.

Figure 2:
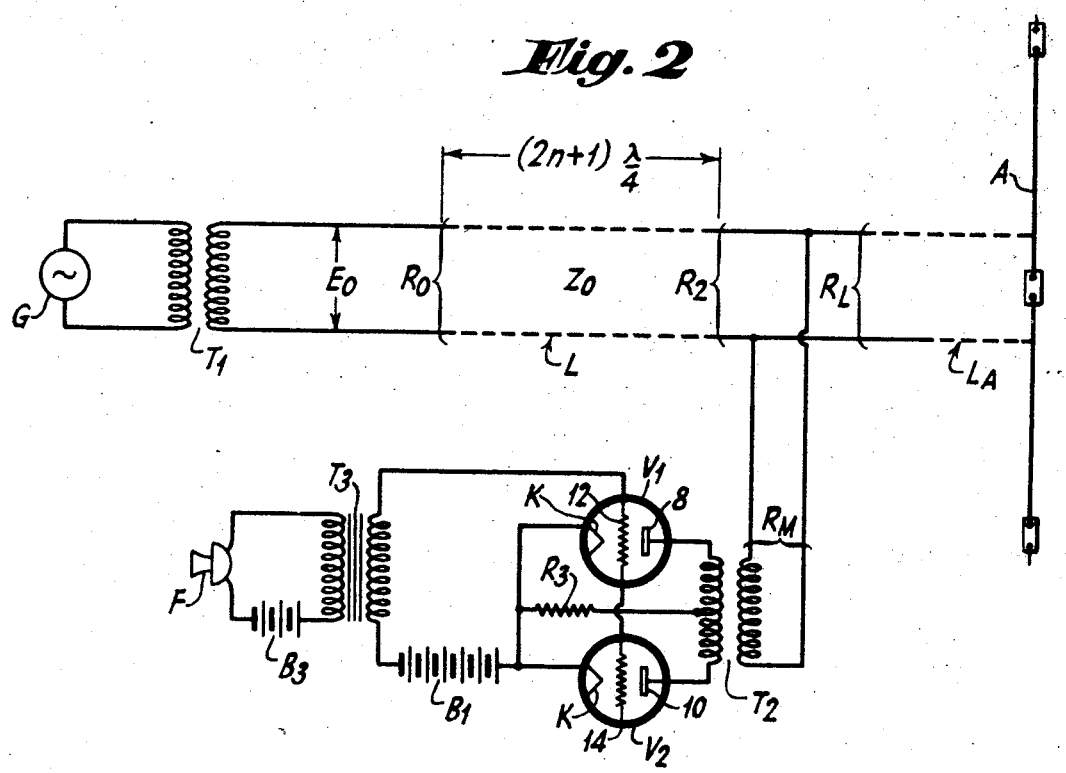
Figure 3:
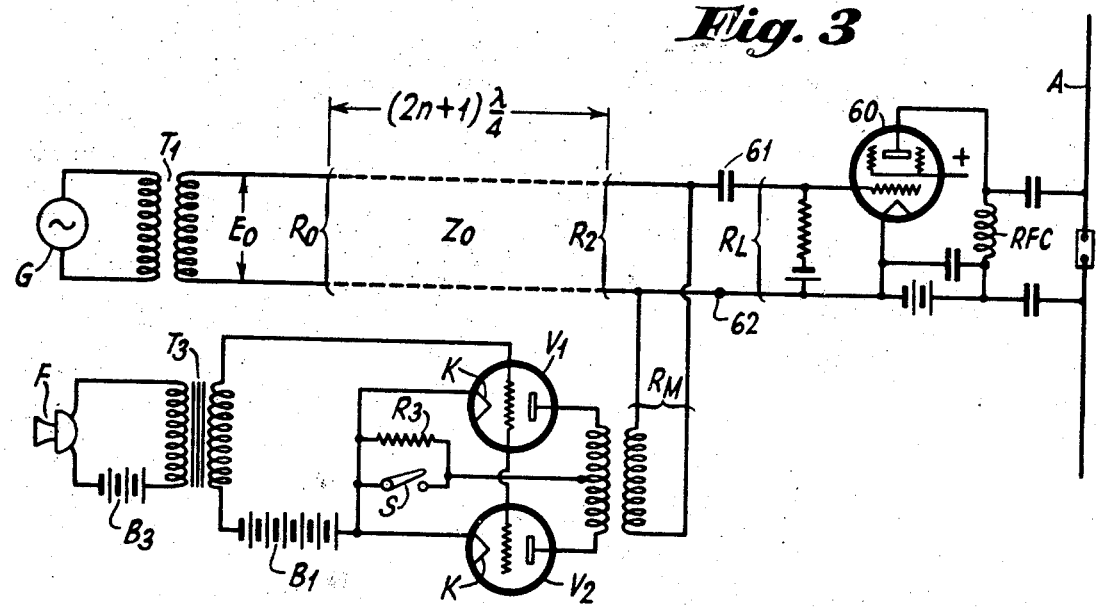
Figure 4:
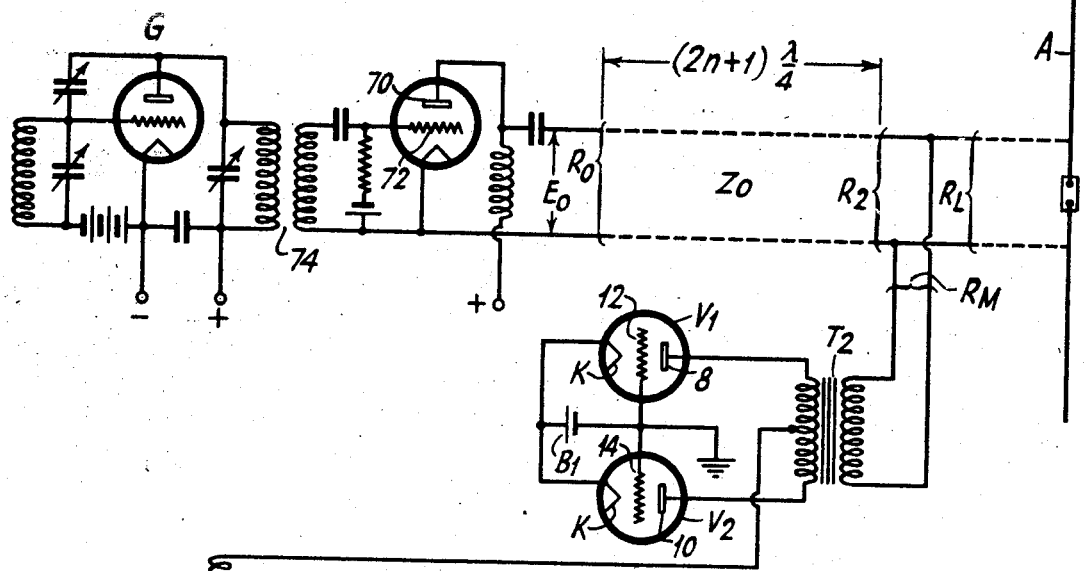

In describing my invention reference will be made to the attached drawings wherein, Figure 1 is a circuit diagram illustrating in a simple manner, my novel method of and means for modulating wave energy in accordance with a wide band of modulating potentials which may be of high frequencies;

Figure 2 is a more complete wiring diagram of a modified form of the system of Figure 1;

Figures 3, 4, and 5 are modifications of the arrangements of Figures 1 and 2;

Figure 6 is a further modification of the arrangements of the prior figures. In Figure 6 additional means is shown for controlling the absorption device; while Figure 7 is curves illustrating the operation of my invention as illustrated in Figure 5.

This invention can best be understood by reference to Figures 1 and 2 of the attached drawings. Referring to Figure 1, G is a generator of alternating currents with an output voltage of $E_o$. This generator is essentially of the substantially constant voltage type. By constant voltage source I have in mind any generator or generator and amplifier having an internal impedance less than the impedance of the load being fed thereby. The output of G is taken by line L and delivered to a useful load $R_L$. This line is essentially an odd number of quarter wave lengths long, the wave length being determined by the frequency of the alternating currents supplied by G and by the velocity of propagation along the line. The circuit supplying power to the load $R_L$ is shunted by an absorbing resistor $R_M$, this absorbing resistor being variable (as indicated by the arrow) by a modulating device not shown, as required to produce the desired modulation. The impedance at the output of the line is designated by $R_2$ and is equal to the parallel impedance of $R_L$ and $R_M$. The impedance at the input end of the line is designated as $R_o$. The value of $R_o$ is determined by the following equation:

$$R_o = Z_o^2/R_2$$

where $Z_o$ is equal to the surge impedance of the line. Normally $R_L$ will be equal to $Z_o$ and for the no modulation condition $R_M$ will also be equal to $R_L$.

Figure 2 represents a particular embodiment of my invention. I have shown transformer $T_1$ interposed between generator G and line L. This is for the purpose of adapting the voltage of the wave source G to the particular line in use. I have replaced the useful load $R_L$ by an antenna A and an antenna feed line $L_A$. This combination presents the same impedance as the original $R_L$. I have shown $R_M$, as comprising the primary winding of a coupling transformer $T_2$, the secondary winding of which is connected in push-pull relation to the plates 8 and 10 of two tubes $V_1$ and $V_2$. The middle point of the secondary of $T_2$ is connected to the cathodes K of these tubes through resistor $R_3$. The control elements 12 and 14 of these tubes are connected through the secondary winding of transformer $T_3$ to a negative terminal of a source of voltage $B_1$, a positive terminal of which is connected to the cathodes. The primary winding of $T_3$ has a battery $B_3$ and a microphone F connected in series with it. The primary of $T_2$ presents the same impedance across the load circuit as the resistance $R_M$ in Figure 1.

The operation of this invention as embodied in Figure 2 is as follows:

When no modulation is being produced by microphone F, this, representing the carrier condition, the bias on the control grids 12 and 14 of tubes $V_1$ and $V_2$ is such that they will absorb power from the line or load circuit provided the level of power in this load circuit is above a certain value. The system would normally be adjusted so that under these conditions generator G would deliver an average amount of power, half of which would be delivered to the antenna A and the other half of which would be absorbed by $V_1$ and $V_2$. Now, if we assume someone speaks in microphone F so as to produce a plus modulation peak of 100%, and with the proper phasing of the transformer connections, voltage would be induced on the grids 12 and 14 of $V_1$ and $V_2$ which would just block off these tubes and prevent them from absorbing any power and at the same time allowing generator G to supply twice as much power as the average value. Since the modulator now takes no power the power in the antenna will be four times that previously assumed. This condition will be true provided voltage $E_o$ remains constant. This can be explained as follows:

For the carrier condition $R_2$ will be equal to $R_L$ and $R_M$ in parallel which will be equal to half of the value of either and also equal to half of the value of $Z_o$. $R_o$, according to the above equation will then be equal to twice $Z_o$. The voltage $E_o$ will then force a current into line L of a particular value. Now at the positive modulation peak when $R_M$ becomes infinite $R_2$ equals $R_L$ and $R_o$ equals $R_L$ or half the value of that under the carrier condition. Thus, halving the impedance of $R_o$ results from the impedance reversing effect of the quarter wave line. Thus, twice the current relative to that under the carrier condition will be forced into the line, which represents twice the power. This doubling of the current while the voltage is maintained constant results in doubling the output of the system.

Now if we assume a negative modulation peak the grids 12 and 14 of $V_1$ and $V_2$ will become positive (bias source $B_1$ overcome) so that these tubes constitute an almost complete short circuit across the load circuit, thus making $R_2$ essentially zero. When $R_2$ is zero $R_o$ will, due to the effect of the impedance reversing network, be infinite and no power will be delivered from the generator to the load nor to the modulator. Intermediate values of modulation will have effects intermediate between the extremes cited.

Tubes $V_1$ and $V_2$ preferably have sufficiently high power absorbing capabilities so that the voltage on their grids will, to a great extent, determine the voltage across $R_L$. Thus, the modulation of the current to the antenna will be essentially equivalent to that impressed on the grids of $V_1$ and $V_2$. In case the voltage across $R_L$ tends to become higher than this value more power will be absorbed by the tubes $V_1$ and $V_2$, the modulator will present a lower impedance which, due to the impedance reversing effect of the line will result in a higher value of $R_o$ and will further result in a decreased power delivered by the generator or source of wave energy G. Thus, in case of a variation in the voltage $E_o$ it will tend to be compensated or neutralized in this manner. In other words under the most favorable conditions the absorber tubes $V_1$ and $V_2$ absorb power at the voltage peaks only, the value of the peaks at which they operate being in turn controlled by the modulating voltage or current. If desired, this ability to absorb power may be extended to cover the entire or substantially the entire carrier wave range by properly proportioning the circuit dimensions and potential sources.

Any appropriate tubes having any number of electrodes may be used at $V_1$ and $V_2$.

The operation of this device as described above results in the following conditions: For the positive modulation peaks the generator delivers twice its average power and for the negative modulation peaks it delivers zero power. Accordingly, the average power from the generator is essentially constant with or without modulation. Under carrier conditions half of the generator power is absorbed by the modulators and half goes to the antenna. The modulators absorb a maximum amount of power under carrier conditions and for either positive or negative modulation peaks they absorb less power. In case of 100% sine wave modulation the average power absorbed by the modulator will be half of that absorbed under carrier conditions.

a. An amplifier comprising an electron discharge tube 60 of any type may be installed in place of $R_L$, as shown in Figure 3, its input being coupled at 61 and 62 to the line L and its output delivering power to the useful load A.

b. $R_L$ may have an impedance other than equal to $Z_o$.

c. The length of line L may differ substantially from an odd number of quarter wave lengths without departing from the spirit of my invention.

d. The plates of $V_1$ and $V_2$ may have the modulating voltage impressed on them, as illustrated in Figure 4, the grids being either connected to a definite bias voltage as shown in Figure 4 or also being modulated as shown in Figure 5. The plates are modulated in phase as shown in Figure 4 by connecting the anode of a modulation potential amplifier 63 to a point on the plate winding of T₂ and connecting the cathode 64 of 63 to the cathodes of V₁ and V₂. A source of potential B₆ supplies plate current for 63 through a modulating potential reactor 65. A radio frequency choke RFC may be included in the modulation circuit. When grid and plate modulation is used the transformer T₃ has two secondaries, one of which supplies potential for grid modulation as in Figure 2 and the other plate modulation as in Figure 4.

e. Resistor R₃ may be short circuited by a switch S as shown in Figure 3.

f. Any other useful load may be substituted for the antenna.

g. Any other source of modulation can be used in place of the microphone such as a telegraph signal device, a facsimile transmitting device, a television transmitting device, etc.

h. Generator G may be a vacuum tube oscillator as shown in Figure 4. Moreover, the generator may supply the line directly as in Figures 1, 2, and 3 or through an amplifier 70 as in Figure 4. The generator G may be of any known type such as the regenerator circuit shown in Figure 4. The generator G may be a dynamo or it may be an arc oscillator. The amplifier 70 has its control electrode 72 coupled at 74 to the generator and its output electrode 76 coupled to the input of line L.

i. R_M may be any form of variable impedance such as any combination of inductance, capacity and resistance and it may be controlled by any desired method.

j. The line L may consist of non-concentric parallel cylinders or of concentric cylinders or it may be a coil of wire or it may be an artificial line.

In a modification of my system as described hereinbefore for improved operation I make use of a means similar to the means described in my United States Patent #2,036,639, dated February 25, 1936, for controlling the ability of the absorption circuit to absorb energy in accordance with peak values of the alternating current in the line and in turn controlling the points at which said peak values become effective to feed the absorption circuit, in accordance with modulating potentials to thereby modulate the wave energy in an efficient manner in accordance with the basic principles of this invention as described immediately above. In describing this modification reference will be made to Figure 6 of the drawings which includes a wiring diagram of the modified transmitter and a chart of estimated voltages in the various elements of the modulator circuits.

In Figure 6, G is again a generator as in the prior figures, L is the line connected at its input to the generator and at its output to an absorbing system designated broadly R_M and a load 33, the impedance of which is again designated as R_L the length of the line between the generator and the load and absorbing system is again preferably $(2n+1)\lambda/4$. The absorption system comprises in its entirety a transformer 39 or other means for applying modulating potentials supplied to the connections 38 to the control grid of an electron discharge device 41. The control grid of this device is maintained at the desired negative potential relative to the cathode by a source of potential 40. The anode of tube 41 is connected by a resistor 42 to the cathode of a sub-sub-absorber device comprising tubes 36 and 37. The control grids of tubes 36 and 37 are coupled by an inductance 35 to an inductance 34 connected to the line L. The cathodes of tubes 36, 37, 41 are connected as shown to a source of potential 58. The anodes of tubes 36 and 37 are connected to the cathodes thereof by way of a resistor 43 and a voltage adjusting resistor 44, the other portion 45 of which is connected to a positive terminal of source 58. A sub-absorber discharge tube 46 has its input electrodes connected in shunt to the resistor 43 and its anode connected to a resistor 47, the lower potential point of which is connected to the source 58. The absorber tubes 54 and 55 have their controlling electrodes connected together and connected to one terminal of the biasing resistor 47. These connections include radio frequency reactances 48 and 49. The cathodes of tubes 54 and 55 are connected together and to another positive point on the source 58. The anode electrodes of tubes 54 and 55 are coupled in push-pull relation by a reactance 56 coupled to a second reactance 57 connected in shunt to the output of the line L. Capacities 50 and 51 connect the anodes of tubes 54 and 55 to the control grids of said tubes respectively to impress high frequency energy in phase on the anode and control grid of each tube. The condensers 52 and 53 taken with 50 and 51 divide the voltages so as to impress the desired portion of the voltage from the anodes on the respective grids of the tubes.

In operation it may be stated in general that generated radio frequency appearing in the line L and in the load is impressed on 34 and on 57. The tubes 36 and 37 are so biased that peak values of this wave energy act through coupling or absorber devices 36 and 37 and 46 to control the absorption abilities of tubes 54 and 55 to thereby control the amount of power they absorb from the output of line L in accordance with the peak values of said power. The peak values are in turn controlled in accordance with the modulating potentials by controlling the instantaneous bias on tubes 36 and 37 in accordance with the potential drop in 42 which potential drop is in turn controlled in accordance with the instantaneous value of the modulating potentials and bias from source 40 on the control grid of tube 41. The operation of this system is in general as disclosed in my United States Patent #2,031,639 and as described above and as described more in detail hereinafter.

This can be illustrated by reference to Figure 6. In this figure, G is a generator of alternating power. We can assume that it has a frequency of 20 mc. and is capable of delivering an average power of 5 kw. and a peak power of 10 kw. L is a transmission line which can be assumed to consist of 2 wires spaced 12" and each 0.162" dia., and thus having a surge impedance of 600 ohms. We can assume that the line is a quarter of a wave length long which is, at this frequency, 3.75 meters. 33 is a suitable working load such as a system of radiator wires and so arranged as to present an impedance of 600 ohms resistance at its input terminals.

54 and 55 are thermionic tubes which are inductively coupled to the output terminals so as to constitute a power absorbing device. The extent to which power is absorbed is governed by the modulation introduced at input 38 through the intervening network 34 to 37, 39 to 53, and 50 to 58. This network is shown in detail to illustrate a practical embodiment of my invention, and itself comprising several features of my invention.

The above network operates in accordance with the principles of my invention covered in my United States Patent #2,036,639, dated February 29, 1936. Assuming the condition of carrier without modulation, the sub-sub-absorber tubes 36 and 37 are biased 42 to an intermediate value. This bias will be more than enough to block the tubes so that no current will flow in resistance 43. However, the grids of 36 and 37 due to the couplings 34 and 35 have radio frequency voltage impressed on them which, at its positive peaks, allows plate current to flow. This plate current flows through 43 and produces a voltage across it which tends to block sub-absorber tube 46. When tube 46 is partially blocked the current flowing through its plate circuit and through resistor 47 is decreased and thus the bias on the absorber tubes 54 and 55 is decreased, these tubes become conductive or more conductive and this allows the absorber to absorb more power from the line.

When additional power is absorbed from the line, as above, the line voltage will drop. When this voltage drops less current will flow through the plate circuits of 36 and 37 and through 43. As a consequence tube 46 is biased less negative and more current flows through 47. This results in a lower blocking voltage on tubes 54 and 55 and the absorber takes less power from the line so that its voltage rises again. Thus a state of equilibrium is attained wherein the radio frequency voltage in the line is of such a value as to cause plate current to flow in 36 and 37 only at the radio frequency peaks. Circuit adjustments are made so that this radio frequency voltage is of a value suitable for the carrier value.

Now assume that the modulation voltages from 38 amplified in 41 acts in resistance 42 to increase the bias between the grids and cathodes of tubes 36 and 37. A small increase in this bias will tend to block the tubes even on the positive peaks of the radio frequency, thus tending to decrease the current through 43, increase the current through 47 and eventually causing 54 and 55 to tend to absorb less power from the line. This will allow the line voltage to rise until plate current does flow in tubes 36 and 37 at the radio frequency peaks. Thus the radio frequency line voltage will follow the bias on tubes 36 and 37 so that at all times it will be just sufficient to cause plate current to flow in said tubes at the radio frequency peaks and accordingly the desired modulation will be obtained.

This peak level control means then acts to modulate the end or terminating impedance of the impedance reversing line L to accomplish modulation in a linear manner of the wave energy fed by line L from G to the load.

The tabulation in Figure 6 shows the conditions which are expected at different points in the circuit and at three points on the modulation curve corresponding to plus 80%, carrier, and minus 80% modulation respectively.

The condensers 50, 51, 52, and 53 of Figure 6 are used to aid the power absorbing capabilities of tubes 54 and 55 by having the effect of impressing radio frequency on their grids in phase with that on their plates.

In the operation of this invention the power and voltage conditions will be as shown in Figure 7. It will be noted that when the load carrier power is set at 2.5 kw. the generator will deliver 5 kw. and the absorbing device will absorb 2.5 kw. At the positive modulation peaks for 100% modulation the output power will be 10 kw. while no power will be absorbed by the absorbing device. Thus the full power capabilities of the power generator are available when maximum power is demanded.

At the negative modulation peaks for 100% modulation the power to the load must be zero. The power to the power absorbing device will also be zero so the generator will not deliver any power. Probably it will be difficult to obtain full 100% negative modulation in practice so this is mostly a theoretical point. The tabulation of Figure 6 indicates, however, that 80% negative modulation should be practical.

It will be noted that the average power from the generator over the modulation cycle remains constant. Accordingly, the average power for any degree of modulation will remain constant. This may allow simplification in the design of the power generator.

While I have illustrated my invention as above it is to be understood that many modifications in the specific circuits can be made within its scope. Any means known to the art may be used in place of the power absorbing device I have shown and the method of controlling this device may be changed. The feature involving coupler 34—35 and tubes 36 and 37 may be omitted entirely. The length of line L may be any odd number of quarter wave lengths long and it may be an artificial line if desired.

With circuits corresponding in general to those of Figure 6, modifications may be made such as connecting resistors in the plate circuit of tubes 54 and 55 so as to absorb a part of the power and thus relieve these tubes from absorbing and dissipating all of the power. Also the specific means illustrated for causing the line voltage to react on the power absorbing device may be replaced by any other suitable means.

I claim:

1. In a signalling system in combination, a source of wave energy, a load circuit, a transmission line connecting said source of wave energy to said load circuit, said transmission line being of a length substantially equal to an odd number of quarter wave lengths, an absorber system connected in shunt to said load circuit, said absorber system comprising an impedance which may be varied between two limits, a source of modulating potentials coupled to said impedance to vary the same at signal frequency between said two limits and additional means coupling said line to said impedance to control one of the limits between which said impedance may be varied in accordance with peak values of the wave energy in said line.

2. In a modulation system in combination, a source of wave energy, a load circuit, a transmission line coupling said source of wave energy to said load circuit to deliver power from said source of wave energy to said load circuit, a power absorbing device effectively in shunt to said load circuit, a sub-absorbing device coupled to said line to take power from said line when the power level in said line exceeds a certain variable value, the magnitude of said variable value being determined by the impedance of said sub-absorbing device, means excited by the power taken by said sub-absorbing device from said line to control said power absorbing device so as to limit the power level in said power line to substantially the threshold level at which said sub-absorber takes power from said line, and means for varying the impedance of said sub-absorbing device at signal frequency to thereby vary the power taken from said line by said devices and thereby modulate the power delivered by said source to said load circuit.

3. In a signalling system, a source of high frequency wave energy, a load circuit, a line of an electrical length equal to an odd number of quarter wave lengths coupled at its input to said source and at its output to said load circuit to transfer energy from said source to said load circuit, a first absorption system the absorption characteristic of which is variable, coupled to said line to draw energy therefrom, said absorption system normally absorbing peaks only of energy in said line, a second absorption system the absorption characteristic of which is adjustable coupled to said line to draw energy therefrom, said second absorption system normally absorbing an average amount of energy from said line, means for varying the absorption characteristic of said first absorption member about said normal condition at signal frequency, and means connecting said first absorption system to said second absorption system to vary the absorption characteristic of said second absorption member about said average amount in accordance with variations in peak values of energy in said line and said signals.

4. In a signalling system a source of wave energy of substantially constant alternating current voltage, a load circuit, a line the length of which is equal to an odd number of quarter wave lengths coupled at its input to said source of wave energy and at its output to said load circuit, a first absorber comprising a pair of electron discharge devices having input electrodes coupled to said line and having output electrodes, means for applying a selected bias to the input electrodes of said devices, means for varying said bias at signal frequency, a second absorber system comprising a second pair of electron discharge devices having output electrodes coupled in phase opposition to said line and having input electrodes, means biasing said input electrodes of said second pair of devices to a potential such that said second pair of devices absorb a predetermined amount of energy from said line, and means coupling the input electrodes of said second pair of devices to the output electrodes of said first named pair of devices to modify said bias on the input electrodes of said second pair of devices in accordance with the current passed by said first named pair of devices to thereby vary the amount of energy said second devices absorb from said line.

5. In a signalling system in combination, a source of wave energy, a load circuit, an impedance inverting network coupling said source of wave energy to said load circuit, a power absorber coupled in shunt to said load circuit, said absorber comprising an impedance which may be varied between two limits, means for reducing the value of said impedance when the wave energy in said network exceeds a selected peak value, and a signalling device coupled with said means for controlling the peak value at which said means becomes effective to reduce the value of said impedance.

6. In a signalling system, a source of wave energy having internal impedance, a load circuit having impedance of higher value than the impedance of said source, an impedance inverting network coupling said source of wave energy to said load circuit, a variable impedance coupled in shunt to said load circuit, controllable impedance control means coupled to said network and to said variable impedance and controlled by peaks of said wave energy for controlling the value of said variable impedance and thereby the power absorbed by said variable impedance, and means for controlling the operating range of said control means at signal frequency to thereby modulate the power supplied to said load circuit at signal frequency.

7. In a signalling system, a source of wave energy of substantially constant voltage, a load impedance, an impedance inverting network coupling said source to said load impedance, an electron discharge device impedance coupled in shunt to said load impedance, means coupled with said device for lowering the impedance of said device when the wave energy in said network exceeds a selected peak value, and other means coupled with said last named means for controlling the peak value at which said first named means becomes effective to lower the impedance of said device.

8. In a signalling system, a source of wave energy having internal impedance, a load circuit having impedance of higher value than the impedance of said source, an impedance inverting network coupling said source of wave energy to said load circuit, a variable tube impedance coupled in shunt to said load circuit, a second tube impedance, for controlling said first tube impedance, coupled to said network and to said first tube impedance and controlled by peaks of said wave energy for controlling the value of said variable tube impedance and thereby the power absorbed by said variable tube impedance, and means for controlling the operating range of said second tube impedance at signal frequency to thereby modulate the power supplied to said load at signal frequency.

9. In a modulation system, a source of wave energy of substantially constant voltage, a load impedance, an impedance inverting network coupling said load impedance to said source to deliver wave energy from said source to said load impedance, an electron discharge device having a control electrode, a cathode, and an anode, a circuit coupling said anode and cathode in shunt to said load impedance, a circuit coupling said control grid and cathode to said source to control the impedance between the anode and cathode of said device by peaks of wave energy delivered by said source, and means coupled with said device for controlling its response to said peaks in accordance with signals.

10. In a modulation system, a source of wave energy of substantially constant voltage, a load impedance, an impedance inverting network coupling said load impedance to said source to deliver wave energy from said source to said load impedance, an electron discharge device having a control electrode, a cathode, and an anode, circuits coupling said anode and cathode in shunt to said load impedance, a controllable source of bias potential connected between the control grid and cathode of said device, means excited by peaks of wave energy in said network for controlling the potential of said source, and means coupled with said last named means for controlling its response to said peaks in accordance with signals.

11. In a signalling system, a source of wave energy of substantially constant voltage, a load impedance, an impedance inverting network coupling said source to said load impedance, a pair of electron discharge devices having electrodes coupled in shunt to said load and having control electrodes, means coupled with said control electrodes for lowering the impedances of said devices when the wave energy in said network exceeds a selected peak value, and other means coupled with said last named means for controlling the peak value at which said first named means becomes effective to lower the impedances of said devices.

12. In a modulation system, a source of wave energy of substantially constant voltage, a load impedance, an impedance inverting network coupling said load impedance to said source to deliver wave energy from said source to said load impedance, a pair of electron discharge devices each having a control electrode, a cathode, and an anode, a circuit coupling said anodes and cathodes in shunt to said load impedance, a controllable source of bias potential connected between the control grids and cathodes of said devices, tube means excited by peaks of wave energy in said network for controlling the potential of said source, and tube means coupled with said last named tube means for controlling its response to said peaks in accordance with signals.

13. In a modulation system, a source of wave energy of substantially constant voltage, a load impedance, an impedance inverting network coupling said load impedance to said source to deliver energy from said source to said load impedance, a pair of electron discharge devices having input electrodes and output electrodes, a circuit coupling said output electrodes in shunt to said load impedance, a second pair of electron discharge devices having input electrodes coupled to said source and having output electrodes connected in parallel through an impedance, a coupling tube having input electrodes coupled to said last named impedance and having output electrodes connected to a second impedance, a connection between the input electrodes of said first pair of devices and said second impedance, and means for modulating the potential on an electrode in each of the devices of said second pair of devices at signal frequency.

14. In a signalling system in combination, a source of wave energy, a load circuit, a transmission line connecting said source of wave energy to said load circuit, said transmission line being of a length substantially equal to an odd number of quarter wave lengths, an electron discharge tube absorber system connected in shunt to said load circuit, said absorber system comprising a tube impedance which may be varied between two limits, a source of modulating potentials coupled to said tube impedance to vary the same at signal frequency between said two limits and additional means coupling said line to said tube impedance to control one of the limits between which said tube impedance may be varied in accordance with peak values of the wave energy in said line.

JAMES L. FINCH.